(12) United States Patent
Daniel (10) Patent No.: US 6,419,147 B1
(45) Date of Patent: Jul. 16, 2002

(54) METHOD AND APPARATUS FOR A COMBINED MECHANICAL AND METALLURGICAL CONNECTION

(76) Inventor: David L. Daniel, 2016 Milford, Houston, TX (US) 77098

( * ) Notice: Subject to any disclaimer, the term of this patent is extended or adjusted under 35 U.S.C. 154(b) by 0 days.

(21) Appl. No.: 09/644,807

(22) Filed: Aug. 23, 2000

(51) Int. Cl.$^7$ .......................... B23K 20/00; B23K 9/00; B21C 9/04
(52) U.S. Cl. ...................... 228/194; 228/135; 228/193; 428/544
(58) Field of Search ............................... 228/135–140, 228/193, 194; 428/544–687

(56) References Cited

U.S. PATENT DOCUMENTS

| | | | | |
|---|---|---|---|---|
| 3,427,707 A | | 2/1969 | Nowosadko ................. 29/482 |
| 3,657,592 A | * | 4/1972 | Kellar ......................... 313/357 |
| 3,814,156 A | * | 6/1974 | Bachmann et al. ......... 151/14.5 |
| 4,060,896 A | * | 12/1977 | Wahnish ...................... 32/10 A |
| 4,066,283 A | * | 1/1978 | Struck .......................... 285/53 |
| 4,164,971 A | * | 8/1979 | Strand ......................... 151/14.5 |
| 4,297,160 A | * | 10/1981 | Kusayama et al. ...... 156/331.1 |
| 4,489,887 A | * | 12/1984 | Badertscher et al. ..... 239/132.1 |
| 4,564,226 A | * | 1/1986 | Doherty, Jr. ................. 285/334 |
| 4,893,658 A | * | 1/1990 | Kimura et al. .............. 138/109 |
| 4,962,579 A | | 10/1990 | Moyer ......................... 29/407 |
| 5,094,730 A | * | 3/1992 | Niehaus et al. ............. 205/151 |
| 5,406,983 A | | 4/1995 | Chambers et al. .......... 138/109 |
| 5,431,831 A | * | 7/1995 | Vincent ....................... 252/29 |
| 5,699,955 A | | 12/1997 | Shimizu ...................... 228/194 |
| 6,059,175 A | * | 5/2000 | Hamada et al. ............. 228/194 |

FOREIGN PATENT DOCUMENTS

| | | | |
|---|---|---|---|
| WO | WO 98/33619 | 8/1998 | ........... B23K/13/02 |
| WO | WO 01/72464 A1 | 10/2001 | ........... B23K/20/24 |

OTHER PUBLICATIONS

"Successful Development of Amorphous Bonding Expansion Technology (ABXT)," by Daido Steel Co., Ltd., Dec. 3, 1999.
"Successful Development of Amorphous Bonding Expansion Technology (ABXT)," by Daido Steel Co., Ltd., Jul. 30, 1999.
"Liquid Phase Diffusion Bonding Process," Quarterly paper of Welding Society, vol. 66 ($7^{th}$ of 1997) Aug., 1997, by Dr. Shimizu and Mr. Horio, Daido Steel Col., Ltd.
"1997 Tubing Guide," Hart's Petroleum Engineer International, 1997.
International Search Report for WO 01/72464 A1.

\* cited by examiner

*Primary Examiner*—Tom Dunn
*Assistant Examiner*—Zidia Pittman
(74) *Attorney, Agent, or Firm*—Howrey Simon Arnold & White, LLP (57) ABSTRACT

A combination mechanical and metallurgical connection is provided for joining members such as conduits wherein amorphous diffusion bonding material is placed at mating or abutting surfaces in the mechanical joint, the bonding material is compressed under pressure and heat is applied to cause the bonding material to diffuse into the mechanical connection.

25 Claims, 7 Drawing Sheets

METHOD AND APPARATUS FOR A COMBINED MECHANICAL AND METALLURGICAL CONNECTION

BACKGROUND OF THE INVENTION

1. Field of the Invention

The present invention relates generally to a combined mechanical and metallurgical connection. More specifically, the present invention relates to a threaded connection between two conduits in which an amorphous diffusion bond is also made at the threaded connection.

2. Description of the Related Arts

For purposes of this application, the present inventions will be described in contrast with mechanical and metallurgical connections that have been used in the oil and gas exploration and production industries. This background to which the present invention is compared and contrasted is not meant to limit the broad applicability of the inventions disclosed herein in any manner.

The oil and gas industry is challenged with finding more oil and gas to meet the ever-increasing worldwide demand. As one example, offshore drilling operations are commonly occurring today in 7,000 feet of water compared to an average of about 2,000 feet merely ten years ago. The cost to complete an offshore well increases exponentially with working depth and the tubular pipe required to complete a well remains the single largest expenditure for consumables.

It is common in the oil and gas exploration and production industries to use a threaded connection to join components, such as oilfield tubulars and pipes. Threaded tubular connections may be broadly categorized as coupling or non-coupling. Non-coupling connections typically cost less to manufacture and require less space downhole. However, such slim-hole connections typically are not as strong as the parent material, which they connect in terms of tensile, compressive and bending strength, or in the ability to seal against internal or external pressure. Various designs exist for threaded connections that meet established performance characteristics. For instance, threaded connections having substantially the same tensile strength as the parent material and substantially the same pressure capability as the parent material have been successfully designed. However, such connections always result in increased outside diameter compared to the parent conduit, which, therefore, requires a larger wellbore and concomitant increases in costs. Moreover, it is not uncommon for operators to require "burst before leak" performance from mechanical connections. Applicant is unaware of any mechanical connection having substantially the same geometry as the tubulars being joined and which also provides "burst before leak" performance.

When dimensional restrictions exist, threaded connections have been designed that are able to join sections of conduit with very little change in dimensions between the conduit and the connection. Either internally or externally flush connections are available as well as connections that are both internally and externally flush. However, these flush connections always have a lower strength than the parent material. The strength (tensile, compressive, fatigue and/or bending) of these connections can differ as much as 50% or more from that of the conduits being joined, which greatly limits their use.

In contrast to mechanical connections, such as threaded joints, there exist metallurgical connections, such as welded connections. Welded connections can also be finished to be externally flush and may be substantially flush on the internal dimension if proper welding procedures are used. The strength and pressure containment capability of these metallurgical connections can substantially match those of the conduit being joined. However, most welds cannot be performed in environments where a danger of explosive gases exists. Also, welding requires specially trained personnel and extensive non-destructive testing to insure that a proper weld is completed according to the welding specification. Further, traditional welding methods significantly (and often adversely) change the metallurgical, physical and corrosion resistance properties of the pipe in the weld and the heat affected zone. These changes cannot be fully removed or restored without full-scale heat treatment. Traditionally, welded connections have been limited to only the very upper portions of the string, which require the lowest strength and are, therefore, easier to weld.

SUMMARY OF THE INVENTION

One embodiment of the present invention is directed to a method of joining two components, where each component has a threaded end connection designed to mate with the other. An amount of ADB material is located on at least a portion of at least one of the threaded end connections. The threaded connections are joined with a predetermined amount of torque so that the ADB material is compressed between abutting surfaces. Heat is applied to the threaded connection adjacent the ADB material in an amount sufficient to cause diffusion bonding among the ADB material and the joined components.

BRIEF DESCRIPTION OF THE DRAWINGS

The following figures, in conjunction with the written description, illustrate at least one preferred embodiment of the present invention, but do not limit the applicability of the invention to only that shown.

DESCRIPTION OF ILLUSTRATIVE EMBODIMENTS

Figure 1:
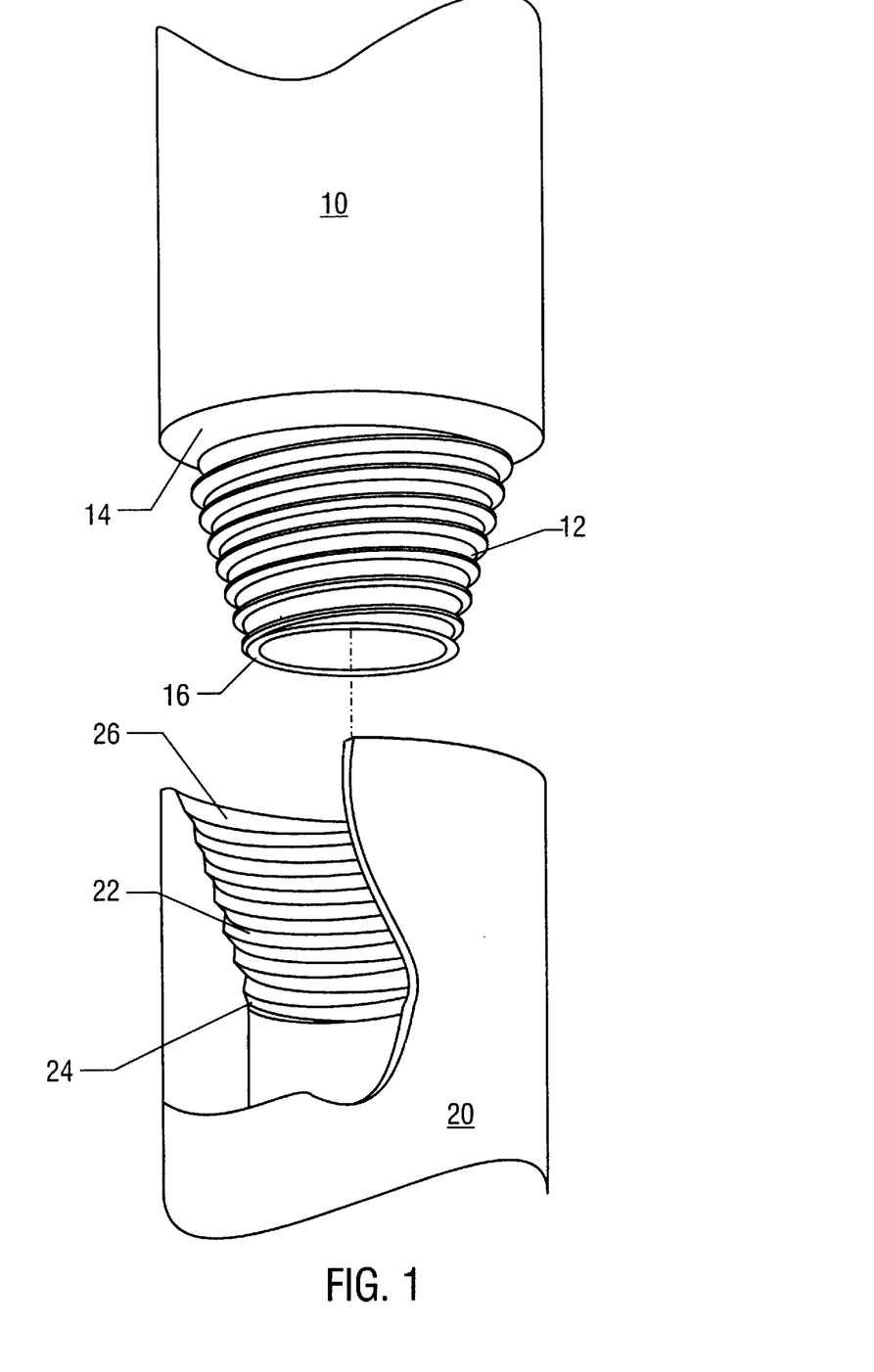
FIG. 1 illustrates a conventional internally and externally flush, tapered thread mechanical connection for conduits.

To illustrate the present inventions through contrast, a conventional, tapered thread internally and externally flush connection is shown in FIG. 1. First tubular 10 has a male (or pin) member 12, which is formed integrally at the end of the conduit. Second tubular 20 has an integral female (or box) member 22 that forms a complimentary receptacle for the male member 12. First tubular 10 typically has a tapered thread, which refers to the external frusto-conical threaded end connection 12 having an inner annular sealing surface 14 and outer annular sealing surface 16. Second tubular 12 has an internal tapered thread, which refers to the frusto-conical, threaded end connection 22 having inner annular sealing surface 24 and outer annular sealing surface 26. The threaded connection illustrated in FIG. 1 is a mechanical connection that is machined on the pipe itself, which necessarily requires removal of parent material. This removal of load bearing material reduces the strength of the connection. The strength of this connection is lower than the strength of either the first or second tubular, 10 and 12.

The present invention is different than the mechanical connection illustrated in FIG. 1 insofar as additional strength and/or sealing ability is provided by an additional connection in the form of a metallurgical bond, preferably an amorphous diffusion bond (ADB) at or adjacent th mechanical connection. Amorphous diffusion bonding is a process that bonds two abutting/mating surfaces of a parent material together. According to the present invention, a bonding material with a lower melting point than either parent material is located between selected mating surfaces of the mechanical connection. By applying pressure and heating the bonding material to a temperature higher than its melting point, but lower than that of the parent material, a slim profile connection with no less strength and sealing ability than the adjacent parent material can be obtained.

The present invention can be implemented using a variety of mechanical connections. For example, in the oil and gas exploration industry, the present invention can be used with oilfield tubulars having straight or cylindrical threads, tapered threads, various proprietary threads or other commonly available threads. With respect to tapered threads and most proprietary threads, those of skill in the art will appreciate that the joint relies on the mechanical connection to provide both strength and sealing properties. In contrast, the present invention can be implemented with non-sealing and sealing threads because the additional metallurgical connection created by the diffusion bond provides the additional strength and sealing abilities that are needed. Thus, the present invention has application to all manner of mechanical connections where connection strength, sealing ability and/or physical profile are important.

For example, the present invention can be implemented in highly stressed mechanical connections in corrosive environments. Because most corrosion mechanisms are accelerated at locations of high stress or residual energy, the ADB bond can be strategically positioned to effectively shield highly stressed areas from the corrosive environment or to reduce stress related corrosion as well as providing strength and sealing ability.

Further, conventional mechanical connections are subject to relaxation or loosening over time caused by service-related vibrations. The combined mechanical/metallurgical connection of the present invention is much less susceptible, if not immune, to this type of connection degradation. This property of the present invention can reduce or eliminate so-called "back-off" failures, which have been linked to contamination of ground water and other ecological disasters, as well as exacting a heavy toll on the economy.

The present invention can also reduce or eliminate the amount of thread lubricant or "pipe dope" that has historically been used with mechanical connections. Most, if not all, of thread lubricants used today contain lead, zinc, copper or other environmentally unfriendly compounds. By creating the metallurgical bond of the present invention at the pressure surface, such as the inside diameter, the connection can be designed to eliminate the need for such lubricants. In addition to addressing several shortcomings of conventional mechanical connections, the present invention can be implemented to solve shortcomings of conventional metallurgical connections, such as welding. For example, some materials are notoriously difficult to weld, such as cast products. Also, welding dissimilar materials poses its own set of problems. The present invention can be used in place of conventional welding, thereby eliminating any shortcomings and expenses.

The following FIGS. 2 through 6 illustrate various implementations of the present invention, but are not intended to limit in any manner the scope of the claims appended to the end of this application.

Figure 2:
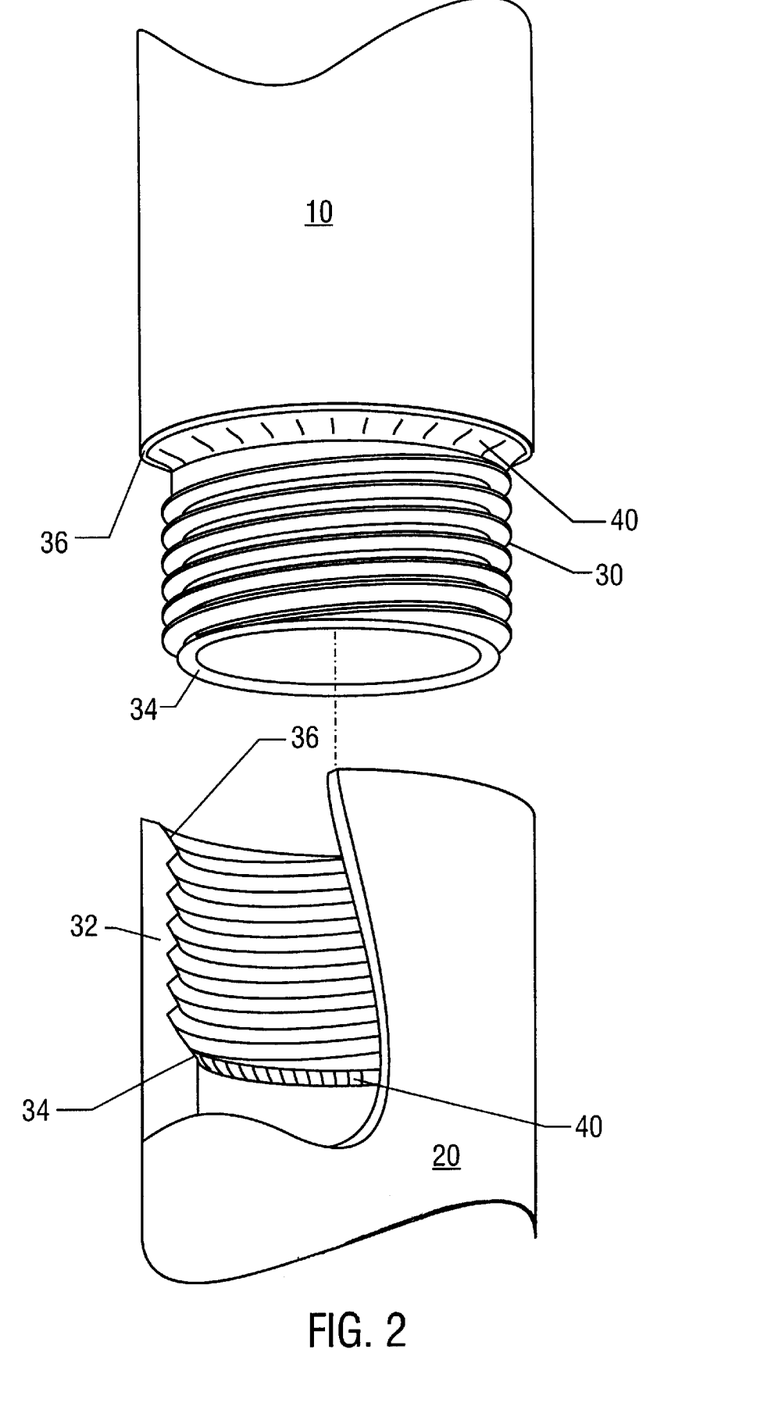
FIG. 2 illustrates a first embodiment according to the present invention.

FIG. 2 illustrates a connection according to the present invention where amorphous diffusion bonding (ADB) material (also known as amorphous metals or metallic glass alloys) in the form of a ring or gasket 40 is applied to the mechanical connection. The mechanical connection illustrated in FIG. 2 is a conventional nonsealing thread (e.g., straight or cylindrical threads) joint having a pin end 30 and a box end 32. This connection also has inner and outer abutting surfaces, 34 and 36, respectively. As shown in FIG. 2, the ADB material in the form of a ring or gasket 40 can be located on the inner abutting surface 34 of the box end 32, on the outer abutting surface 36 of the pin end 30, or on both surfaces. While it is typical for the material of the first and second tubulars to be substantially identical, the present invention can be used to join dissimilar materials as well.

For example, the present invention can be implemented on a collar-type mechanical connection (not shown) comprising two externally threaded (male) components and an internally threaded collar. As is conventional in the art, the collar is used to join the two male components in typically fluid tight engagement. In corrosive environments, the collar is typically required to be made from the same corrosion-resistant material from which the male components are made. For internal corrosive environments, however, the present invention permits the collar to be made from a less expensive material (such as carbon steel) because the metallurgical bond of the present invention can be strategically located at the internal surfaces to effectively shield the collar from the corrosive environment.

Returning to FIG. 2, it is preferred that the bonding surfaces (in this case surfaces 34 and 36) be cleaned to remove any oils, dirt or oxides. Machining, electrochemical machining or electro-discharge machining or other known machining operations may accomplish such cleaning. Also, cleaning with a chemical such as acetone may also be used to remove oil and dirt from the mating surfaces. Preparation of the mating surfaces to remove oxide layers, oil or dirt can help to strengthen the resulting bond between joined materials.

After preparation of the mating surfaces, the bonding material may be applied to or positioned on or adjacent the mechanical connection. The ADB material 40 may be held in place with a binder (not shown) or by electrostatic attraction or any other means that doesn't interfere with the resulting bond. The ADB material preferably used for connecting oilfield tubulars is an iron-based alloy that is similar to the parent material of the connectors and is typically 25 to 100 microns thick. One such supplier of ADB materials suitable for use with this invention is the Allied Signal division of Honeywell, which supplies ADB material under the MetGlass brand. A melting point depressant or flux may be added to the bonding material. Some conventional melting point depressant materials include boron or silicon. As a result of threading the pin 30 into the box 32, the ADB material 40 becomes sandwiched between the abutting portions of the first and second tubulars, 10 and 20 and the tubulars are automatically aligned for bonding.

Figure 3:
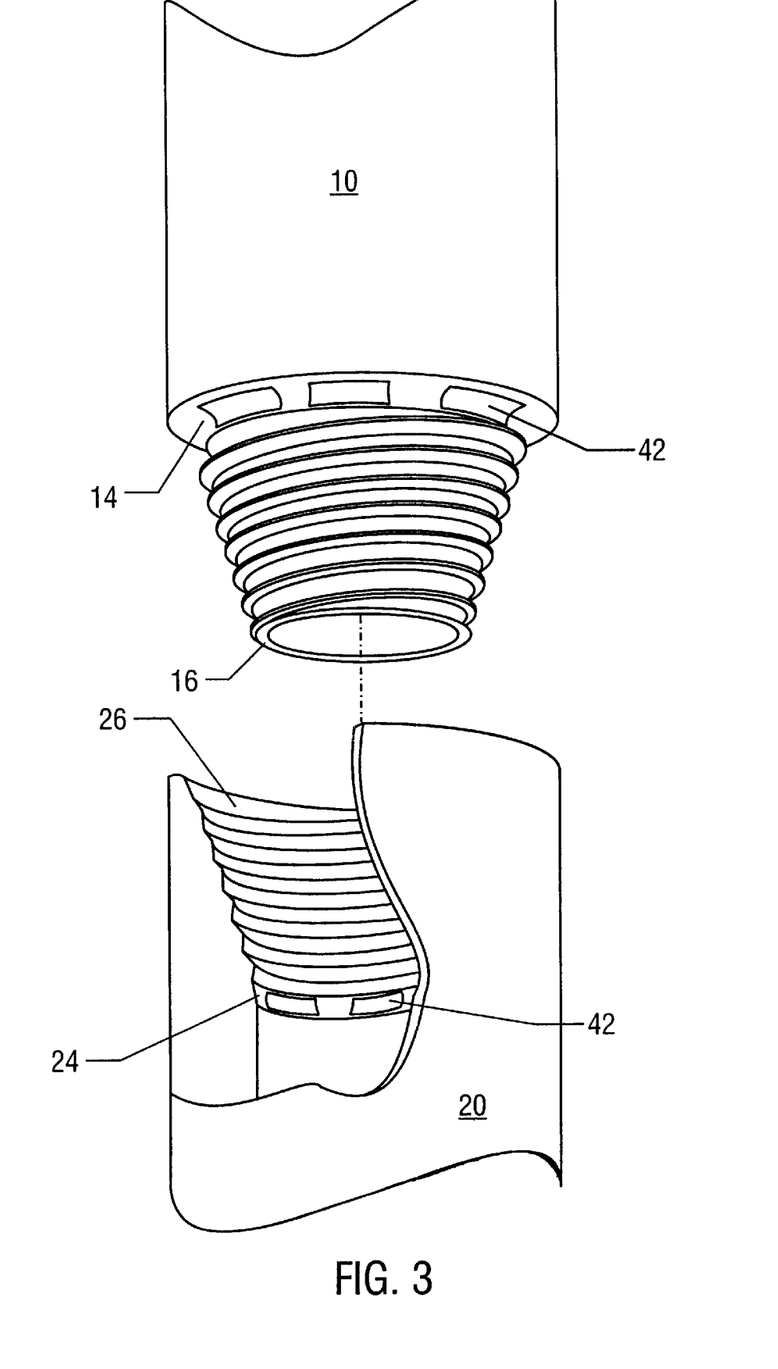
FIG. 3 illustrates a second embodiment according to the present invention.
Figure 4:
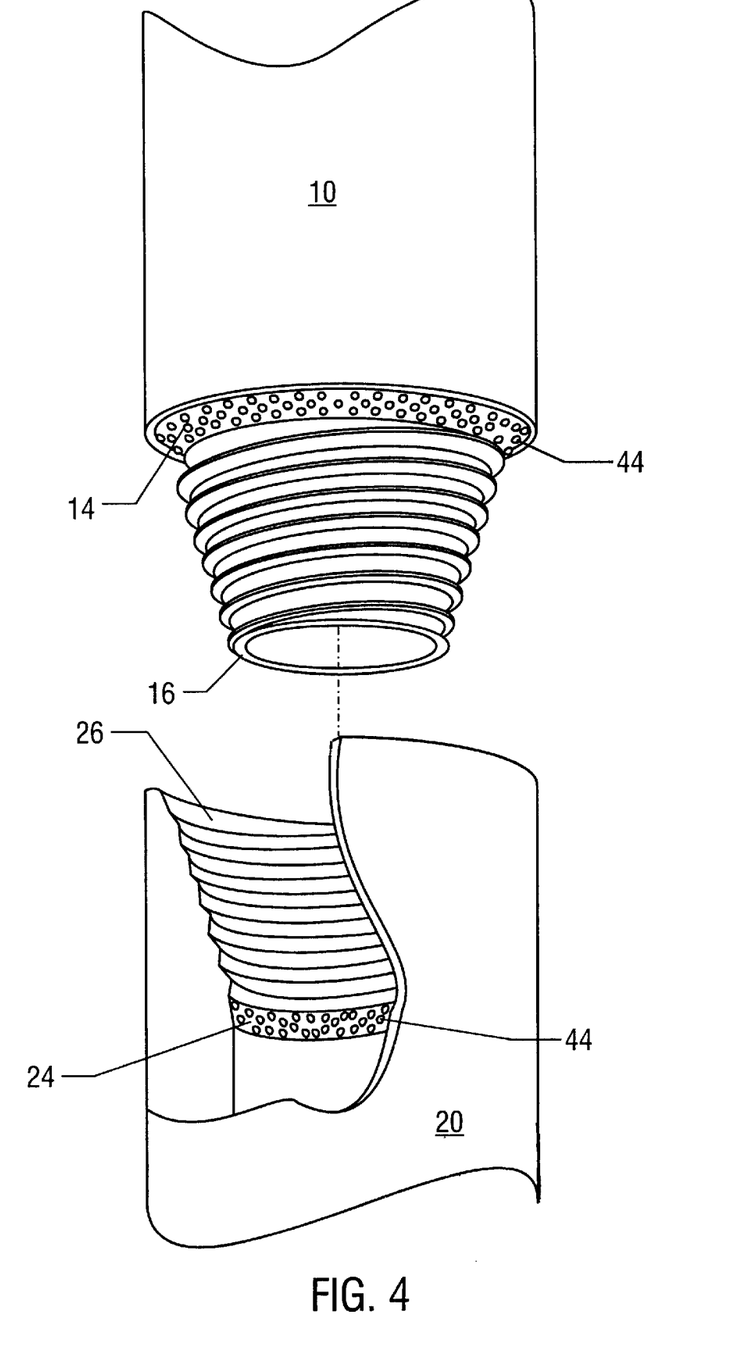
FIG. 4 illustrates a third embodiment according to the present invention.

FIG. 3 illustrates the application of ADB material to conventional tapered thread mechanical connection. However, in contrast to FIG. 2, the ADB material is present in the form of buttons or islands 42 instead of the ring 40 of FIG. 2. FIG. 4 shows an additional embodiment of the application of ADB material according to the present invention. Sputter deposition techniques may be used to coat the desired mating surfaces with bonding material. Sputter deposition involves known techniques for applying a substantially uniform thickness of bonding material and/or melting point depressant on the mating surfaces. As seen in FIG. 4, sputter deposits 44 may be placed on the inner annular sealing surface 14 of first tubular 10. Sputter deposits 44 may also be placed on the inner annular sealing surface 24 of second tubular 20. Alternatively, ADB material may be deposited on virtually any abutting surface of the mechanical connector.

As a result of connecting the male and female conduits, sputter deposits 44 become sandwiched between the parent material of inner annular sealing surfaces 14 and 26. Sputter deposits 44 become sandwiched between the parent material of annular sealing surfaces 16 and 24. Due to the similarities between the use of powders and sputter deposits as bonding material, description of the application of powders with or without binding agent is omitted as being redundant to the previous sputter deposition description.

Figure 5A:
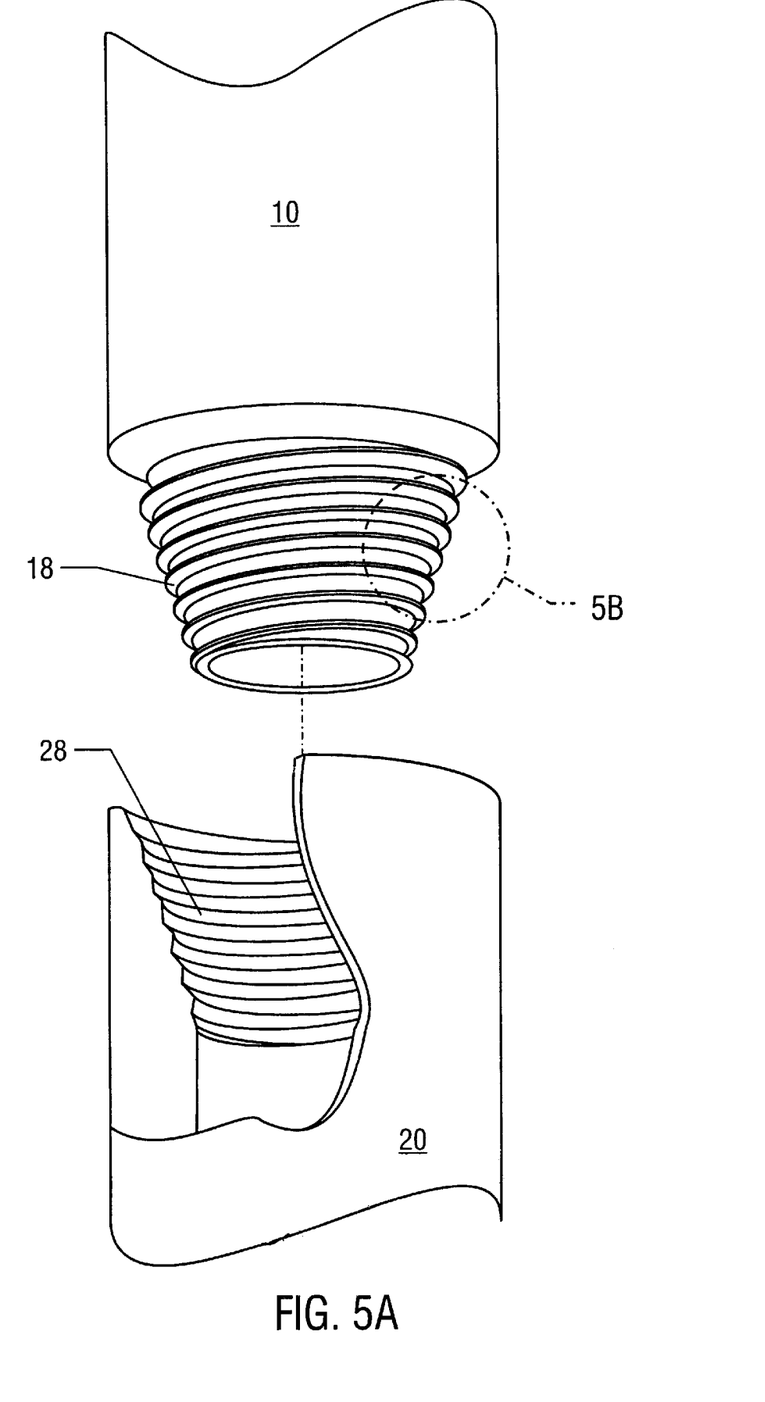
FIG. 5A illustrates a fourth embodiment according to the present invention.
Figure 5B:
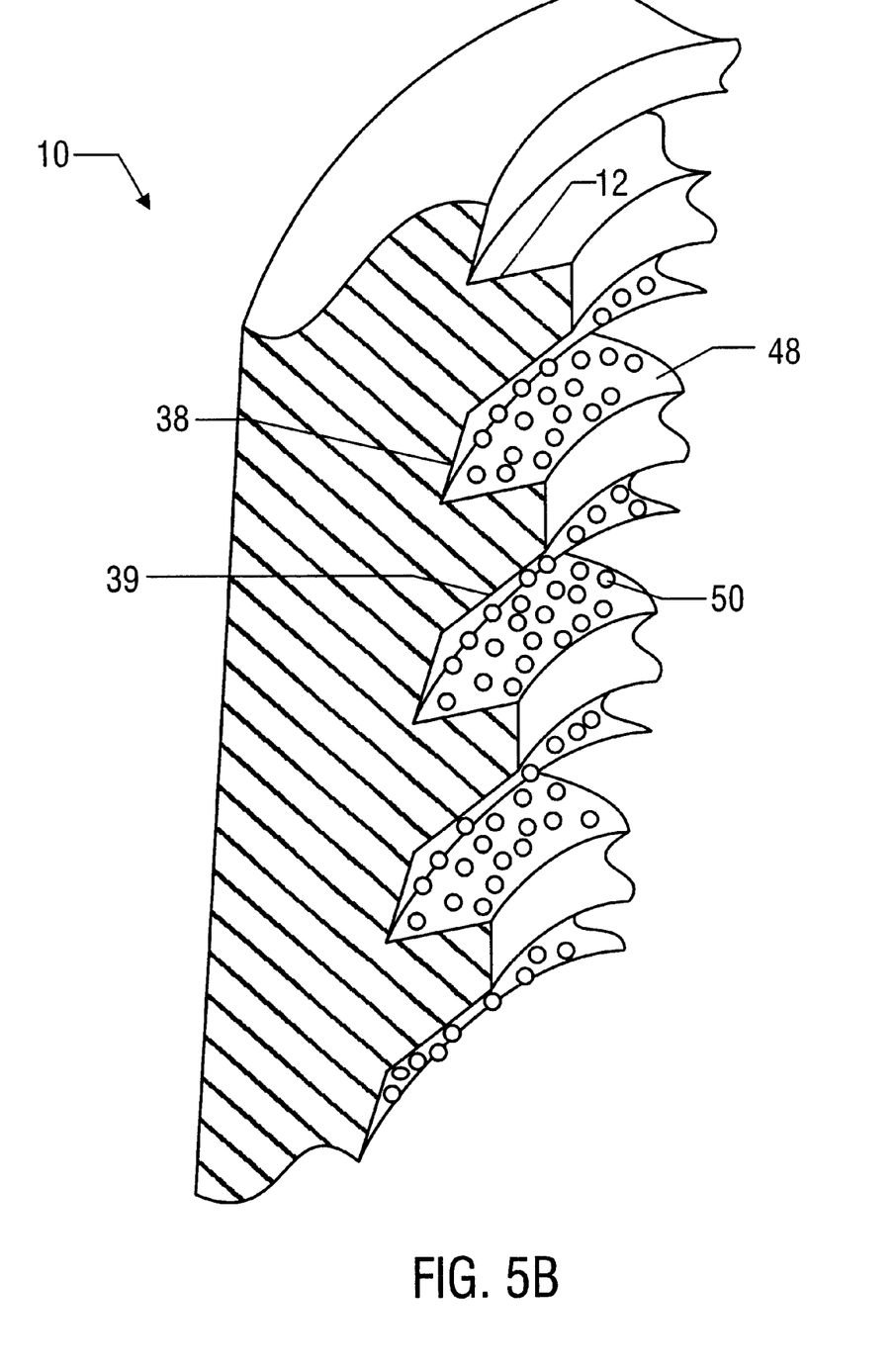
FIG. 5B illustrates the detail of part of the mating surface of FIG. 5A.

FIG. 5A shows an additional embodiment of the application of bonding material according to the present invention. Bonding material in the form of sputter deposits is applied to mechanical threads 18 and 28. FIG. 5B shows a detail of the threaded end connection of the first tubular. Known techniques of sputter deposition are used to apply the bonding material with or without melting point depressant to the thread. In the present embodiment, sputter deposits 48 are located in the valleys 38 of the thread, and sputter deposits 50 are located on the leading flanks 39 of the thread. A shield (not shown) may be used as part of the sputter deposition technique to limit the placement of the bonding material. Bonding material need not be placed solely on the surfaces of the thread shown in the present Figure. Bonding material may also be applied to other abutting surfaces of the threaded end connection.

Figure 6:
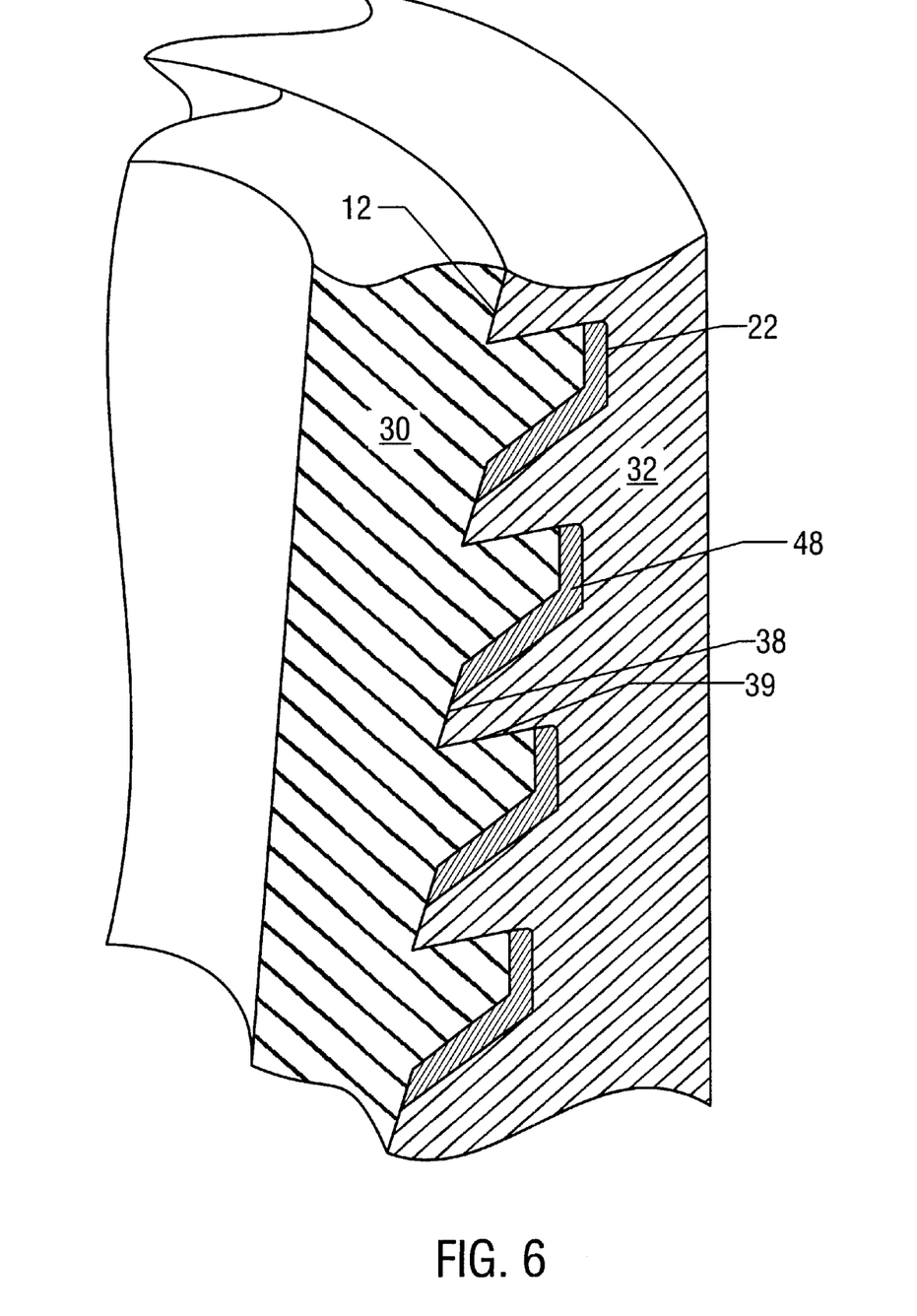
FIG. 6 illustrates a cut-away detail of a combination mechanical/metallurgical connection of the present invention.

With bonding material applied to the mechanical connection, such as in one of the previously described fashions, the connection of the present invention is then formed. To make up the connection, threaded end connections 12 or 30 and 22 or 32 are screwed together until the appropriate surfaces abut. FIG. 6 depicts a connection of the pin 30 and box 32 of the first and second tubulars 10 and 20. The threads of the threaded end connections are integrally meshed as the tubulars are screwed together and the ADB material 48 flows into position in and around the abutting and interfering surfaces.

Axial and radial compressive forces result from screwing the members tightly together. The desired location for the bonding material as noted previously is in those areas where there is abutment between surfaces of the mechanical connection. Further tightening of the connection will cause the locations of abutment to be loaded progressively. Application of torq when the surfaces are in abutment provides the required pressure load to facilitate the amorphous diffusion bonding process. The pressure applied may also be used to break any undesirable oxide layers that may be present at the bonding interface.

With the loading applied to the ADB material, energy in the form of heat is simultaneously applied to the connection joint adjacent the ADB material for a predetermined period of time. Induction, electric resistance, microwave, infrared or the like may accomplish the required heating. In a preferred embodiment for the connection shown in FIG 2, two induction heating coils (not shown), each one adjacent an area of ADB material (at 34 and 36) are used to heat the connection. During the application of heat to the joint, the pressure or load may be maintained, decreased or increased as desired. The pressure also uniformly distributes the liquefied bonding material in the joint, resulting in the thickness of the bond to be minimized During the heating process, the parent material is not adversely effected by the heating conditions, such as occurs in convention welding. With the present invention, only a minimal heat affected zone (HAZ) or metallurgical discontinuity is created. As the ADB material diffuses into the parent material, solidification occurs such that an amorphous diffusion bond forms between the abutted surfaces or interference fits of the connection. The resulting connection with amorphous diffusion bond is substantially stronger than the conventional flush mechanical connection joint. Diffusion of the ADB material may be accomplished in an inert or reactive environment, depending upon the characteristics of the diffusion bond being created.

It will be appreciated by those of skill having benefit of this disclosure of the synergistic relationship between a threaded mechanical connection and the diffusion process. The threaded connection provides automatic alignment and control of the abutting surfaces during the diffusion process. Further, the threaded connection allows the operator to fairly precisely control the application of load to the abutting surfaces during diffusion. For example, as heat is applied to the joint of the present invention, thermal expansion may increase or change the load conditions at the abutting surfaces. The operator can adjust the load at the abutting surfaces (and, therefore, on the ADB material) by adjusting the torque on the mechanical connection. Thus, the present invention obviates expensive and bulky alignment jigs and devices typically necessary for creating high quality diffusion bonds.

It will now be appreciated by those of ordinary skill having the benefit of this disclosure that a combination mechanical/metallurgical connection of the form described herein can provide a connection or joint between members, such as conduits, in which the overall dimensions of the connection are substantially the same as the members joined. Further, this connection provides the strength and sealing abilities necessary for the most demanding applications. The connection designer will appreciate the flexibility offered by the present invention in locating the ADB bond at virtually any location in the connection. The designer, therefore, can locate the sealing effects of the ADB bond at the most preferred location and separately or concomitantly locate the strength and/or corrosion shielding effects of the ADB bond at the most preferred locations. The present invention allows the designer to enhance the resulting connection's overall performance, such as by enhancing the fatigue life of the connection.

Although the present invention has been illustrated in the context of oilfield tubulars having a pin and a box, it will be appreciated that the present invention may be applied as described to connections utilizing sleeve couplings, or clamps and other energizing devices. Further, the present invention may be used with today's expandable tubular technology in which oilfield tubulars are placed downhole then a specially designed pig or mandrel is used to expand the tubular string. Connections made according to the present invention are particularly suited for such service because of the strength, sealing and dimensional attributes described above. However, the application of the present invention is not limited to the oilfield industry or to the connection of one conduit to another. The present invention may be utilized anywhere a conventional mechanical connection or a conventional metallurgical connection has been heretofore used.

The foregoing descriptions of the various embodiments of present invention present a number of advantages over the prior art. Various modifications and variations can be made without departing from the scope of the present invention, as set forth in the accompanying claims.

What is claimed is:

1. A method of joining tubular products comprising:
   providing a first tubular having a threaded end connection;
   providing a second tubular having a threaded end connection configured to makes-up with the threaded end connection of the first tubular;
   placing an amount of amorphous diffusion bonding material on at least portion of a mating surface of at least one of the tubulars;
   joining the first and second tubular by making-up the threaded end connections with a predetermined amount of torque so that the amorphous diffusion bonding material is compressed by the mating surfaces; and
   applying heat to the threaded end connection joint sufficient to cause diffusion bonding among the bonding material and the first and second tubulars.

2. The method of claim 1, wherein the first and second components are selected from the group consisting of: oilfield tubulars, piping, expandable tubing, internally flush, externally flush, and both internally and externally flush.

3. The method of claim 1, wherein the first and second mechanical connections are selected from the group consisting of: sleeve, clamp, sealing and non-sealing.

4. The method of claim 1, wherein placing the bonding material is selected from the group consisting of: placing a gasket, sputter coating, and placing a button.

5. The method of claim 1, wherein applying heat is selected from the group consisting of:
   induction heating, electrical resistance heating, microwave heating, and infrared heating.

6. The method of claim 1, wherein the first and second connection portions are made from dissimilar metals.

7. The method of claim 1, wherein placing the bonding material includes selectively placing the bonding material at one or more locations of high stress or likely failure.

8. The method of claim 1, further comprising varying the torque applied to the mechanical connection to affect the compresive force applied to the bonding material.

9. The method of claim 1, wherein joining the connector portions together accurately aligns the bonding material prior to bonding.

10. A combination mechanical and metallurgical connection comprising:
    a first component having a first portion of a mechanical connection;
    a second component having a second portion of a mechanical connection configured to form a mechanical connection in conjunction with the first portion;
    an amount of amorphous diffusion bonding material located on or adjacent at least one of the first and second portions;
    the first portion and the second portion connected together to form the mechanical connection; and
    a metallurgical connection formed in combination with the mechanical connection through application of a predetermined amount of force to the bonding material and application of heat to the bonding material, thereby creating an amorphous diffusion bond between at least the first and second components.

11. The connection of claim 10, wherein the first and second components are selected from the group consisting of: oilfield tubulars, piping, expandable oilfield tubing, internally flush, externally flush, and both internally and externally flush.

12. The connection of claim 10, wherein the first and second mechanical connections are selected from the group consisting of: sleeve, clamp, sealing and non-sealing.

13. The connection of claim 10, wherein the form of the bonding material is selected from the group consisting of: gasket, sputter coat and button.

14. The connection of claim 10, wherein the heat application is selected from the group consisting of: induction, electrical resistance, microwave, and infrared.

15. The connection of claim 10, wherein the first and second portions are made from dissimilar metals.

16. The connection of claim 10, wherein the bonding material is selectively placed at one or more locations of high stress or likely failure.

17. The connection of claim 10, wherein the force applied to the bonding material is varied.

18. The connection of claim 10, wherein joining the connector portions together accurately aligns the bonding material prior to bonding.

19. A string of tubular components having at least one combination mechanical and metallurgical connection comprising:
    a first tubular component having a first portion of a multi-part threaded mechanical connection;
    a second tubular component having a second portion of the multi-part threaded mechanical connection;
    the first portion and the second portion connected together to form the mechanical connection
    an amount of amorphous diffusion bonding material having a melting point lower than a melting point of either the first or second portions and located in or adjacent the mechanical connection; and
    a metallurgical connection formed in combination with the mechanical connection through application of a predetermined amount of force and application of heat to the amorphous diffusion bonding material, thereby creating an amorphous diffusion bond between the first and second portions.

20. A method of joining two or more components comprising:
    providing a first component having a first part of a multi-part mechanical connection;
    providing a second component having another part of the multi-part mechanical connection;
    placing an amount of amorphous diffusion bonding material on at least portion of a mating surface of the multi-part mechanical connection;
    joining the first and second parts of the mechanical connection so that the amorphous diffusion bonding material is compressed by the mating surfaces;

applying force to the mechanical connection to compress the bonding material further; and applying heat to the mechanical connection sufficient to cause diffusion bonding among the bonding material and the first and second parts of the mechanical connection.

21. The method of claim 20, wherein applying heat is selected from the group consisting of: induction heating, electrical resistance heating, microwave heating, and infrared heating.

22. The method of claim 20, wherein the first and second connection parts are made from dissimilar metals.

23. The method of claim 20, wherein placing the bonding material includes selectively placing the bonding material at one or more locations of high stress or likely failure.

24. The method of claim 20, further comprising varying the force applied to the mechanical connection to affect the force applied to the bonding material.

25. The method of claim 20, wherein joining the connection parts together accurately aligns the bonding material prior to bonding.

* * * * *